(12) United States Patent
Noro

(10) Patent No.: US 7,209,641 B2
(45) Date of Patent: Apr. 24, 2007

(54) DECODER

(75) Inventor: Satoshi Noro, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 950 days.

(21) Appl. No.: 10/444,100

(22) Filed: May 22, 2003

(65) Prior Publication Data

US 2003/0219236 A1 Nov. 27, 2003

(30) Foreign Application Priority Data

May 22, 2002 (JP) ............................ 2002-148050

(51) Int. Cl.
 *H04N 7/087* (2006.01)
(52) U.S. Cl. ...................... 386/84; 386/124; 386/125; 386/126; 386/71; 386/66; 386/109; 386/90
(58) Field of Classification Search .................. 386/84, 386/124–126, 71, 66, 109
See application file for complete search history.

(56) References Cited

U.S. PATENT DOCUMENTS

| | | | |
|---|---|---|---|
| 5,604,723 A * | 2/1997 | Kikuta | ..................... 369/47.32 |
| 6,263,469 B1 * | 7/2001 | Jang | ............................ 714/775 |
| 6,414,920 B1 | 7/2002 | Lee | |
| 6,708,299 B1 | 3/2004 | Xie | |
| 6,879,771 B1 * | 4/2005 | Yoshida et al. | ................ 386/84 |
| 7,035,182 B2 * | 4/2006 | Noro et al. | .............. 369/47.21 |

* cited by examiner

*Primary Examiner*—Thai Q. Tran
*Assistant Examiner*—Helen Shibru
(74) *Attorney, Agent, or Firm*—Fish & Richardson P.C.

(57) ABSTRACT

A decoder having improved accuracy for reading data. The decoder decodes reproduced data including preamble data, to which a first synchronization pattern is added, and information data, which follows the preamble data and to which a second synchronization pattern is added. The decoder includes a memory for storing a first, second, and third comparison patterns respectively corresponding to the first synchronization pattern, the preamble data, and the second synchronization pattern. A comparison circuit compares the first synchronization pattern, the preamble data, and the second synchronization pattern respectively with the corresponding comparison patterns. A determination circuit generates a start signal to start decoding when at least two of the first synchronization pattern, the preamble data, and the second synchronization pattern match the corresponding comparison pattern. A decoding circuit starts error correction of the reproduced data in response to the start signal.

11 Claims, 6 Drawing Sheets

Fig.1 (Prior Art)

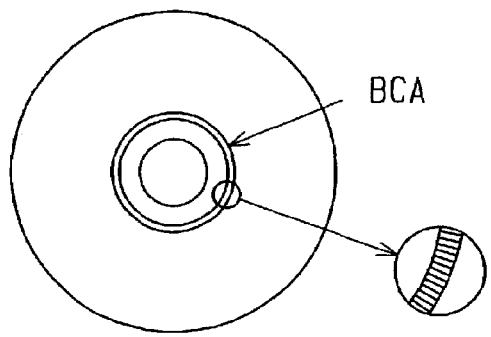

Fig.2 (Prior Art)

| Synchronization Pattern 1 Byte | BCA Data 4 Bytes | | | | |
|---|---|---|---|---|---|
| $SB_{BCA}$ | $PR_0$ | $PR_1$ | $PR_2$ | $PR_3$ | 1 Row BCA Preamble |
| $RS_{BCA1}$ | $I_0$ | $I_1$ | $I_2$ | $I_3$ | |
| $RS_{BCA1}$ | $I_4$ | $I_5$ | $I_6$ | $I_7$ | |
| $RS_{BCA1}$ | $I_8$ | $I_9$ | $I_{10}$ | $I_{11}$ | |
| $RS_{BCA1}$ | $I_{12}$ | $I_{13}$ | $I_{14}$ | $I_{15}$ | |
| $RS_{BCA2}$ | $I_{16}$ | $I_{17}$ | $I_{18}$ | $I_{19}$ | |
| $RS_{BCA2}$ | $I_{20}$ | $I_{21}$ | $I_{22}$ | $I_{23}$ | |
| $RS_{BCA2}$ | . | . | . | . | 4n Rows Information Data |
| $RS_{BCA2}$ | . | . | . | . | |
| . | . | . | . | . | |
| . | . | . | . | . | |
| $RS_{BCA(n-1)}$ | . | . | . | . | |
| $RS_{BCA(n)}$ | . | . | . | . | |
| $RS_{BCA(n)}$ | $I_{16(n-12)}$ | $I_{16(n-11)}$ | $I_{16(n-10)}$ | $I_{16(n-9)}$ | |
| $RS_{BCA(n)}$ | $I_{16(n-8)}$ | $I_{16(n-7)}$ | $I_{16(n-6)}$ | $I_{16(n-5)}$ | |
| $RS_{BCA(n)}$ | $D_0$ | $D_1$ | $D_2$ | $D_3$ | 1 Row $EDC_{BCA}$ |
| $RS_{BCA13}$ | $C_{0,0}$ | $C_{1,0}$ | $C_{2,0}$ | $C_{3,0}$ | |
| $RS_{BCA13}$ | $C_{0,1}$ | $C_{1,1}$ | $C_{2,1}$ | $C_{3,1}$ | 4 Rows $ECC_{BCA}$ |
| $RS_{BCA13}$ | $C_{0,2}$ | $C_{1,2}$ | $C_{2,2}$ | $C_{3,2}$ | |
| $RS_{BCA13}$ | $C_{0,3}$ | $C_{1,3}$ | $C_{2,3}$ | $C_{3,3}$ | |
| $RS_{BCA14}$ | $PO_0$ | $PO_1$ | $PO_2$ | $PO_3$ | 1 Row BCA Postamble |
| $RS_{BCA15}$ | | | | | |

Fig.3 (Prior Art)

| | Bit Pattern | | | | | | | | | | | |
|---|---|---|---|---|---|---|---|---|---|---|---|---|
| | Fixed Pattern | | | | | | | | Synch Code | | | |
| | Channel Bits | | | | | | | | Data Bits | | | |
| | Ch15 | Ch14 | Ch13 | Ch12 | Ch11 | Ch10 | Ch9 | Ch8 | b3 | b2 | b1 | b0 |
| SB$_{BCA}$ | 0 | 1 | 0 | 0 | 0 | 1 | 1 | 0 | 0 | 0 | 0 | 0 |
| RS$_{BCA1}$ | 0 | 1 | 0 | 0 | 0 | 1 | 1 | 0 | 0 | 0 | 0 | 1 |
| RS$_{BCA2}$ | 0 | 1 | 0 | 0 | 0 | 1 | 1 | 0 | 0 | 0 | 1 | 0 |
| RS$_{BCA3}$ | 0 | 1 | 0 | 0 | 0 | 1 | 1 | 0 | 0 | 0 | 1 | 1 |
| RS$_{BCA4}$ | 0 | 1 | 0 | 0 | 0 | 1 | 1 | 0 | 0 | 1 | 0 | 0 |
| RS$_{BCA5}$ | 0 | 1 | 0 | 0 | 0 | 1 | 1 | 0 | 0 | 1 | 0 | 1 |
| RS$_{BCA6}$ | 0 | 1 | 0 | 0 | 0 | 1 | 1 | 0 | 0 | 1 | 1 | 0 |
| RS$_{BCA7}$ | 0 | 1 | 0 | 0 | 0 | 1 | 1 | 0 | 0 | 1 | 1 | 1 |
| RS$_{BCA8}$ | 0 | 1 | 0 | 0 | 0 | 1 | 1 | 0 | 1 | 0 | 0 | 0 |
| RS$_{BCA9}$ | 0 | 1 | 0 | 0 | 0 | 1 | 1 | 0 | 1 | 0 | 0 | 1 |
| RS$_{BCA10}$ | 0 | 1 | 0 | 0 | 0 | 1 | 1 | 0 | 1 | 0 | 1 | 0 |
| RS$_{BCA11}$ | 0 | 1 | 0 | 0 | 0 | 1 | 1 | 0 | 1 | 0 | 1 | 1 |
| RS$_{BCA12}$ | 0 | 1 | 0 | 0 | 0 | 1 | 1 | 0 | 1 | 1 | 0 | 0 |
| RS$_{BCA13}$ | 0 | 1 | 0 | 0 | 0 | 1 | 1 | 0 | 1 | 1 | 0 | 1 |
| RS$_{BCA14}$ | 0 | 1 | 0 | 0 | 0 | 1 | 1 | 0 | 1 | 1 | 1 | 0 |
| RS$_{BCA15}$ | 0 | 1 | 0 | 0 | 0 | 1 | 1 | 0 | 1 | 1 | 1 | 1 |

Fig.5

| $SB_{BCA}$ | | | | | | | | | | BCA-Preamble | | | | $RS_{BCA1}$ |
|---|---|---|---|---|---|---|---|---|---|---|---|---|---|---|
| ch15 | ch14 | ch13 | ch12 | ch11 | ch10 | ch9 | ch8 | b3 | b2 | b1 | b0 | | | |
| 0 | "0" | 0 | 0 | 0 | 1 | 1 | 0 | 1 | 1 | 1 | 0 | "0" | 0 | |
| • | | • | • | • | • | • | • | • | • | • | • | • | • | • |
| • | | • | • | • | • | • | • | • | • | • | • | • | • | • |
| • | | • | • | • | • | • | • | • | • | • | • | • | • | • |
| • | | • | • | • | • | • | • | • | • | • | • | • | • | • |
| • | | • | • | • | • | • | • | • | • | • | • | • | • | • |
| • | | • | • | • | • | • | • | • | • | • | • | • | • | • |
| • | | • | • | • | • | • | • | • | • | • | • | • | • | • | on a disc medium of a decoder.

DECODER

CROSS-REFERENCE TO RELATED APPLICATIONS

This application is based upon and claims the benefit of priority from the prior Japanese Patent Application No. 2002-148050, filed on May 22, 2002, the entire contents of which are incorporated herein by reference.

BACKGROUND OF THE INVENTION

The present invention relates to a decoder, and more particularly, to processing related with the reproduction of data recorded in a predetermined format at a burst cutting area ("BCA") of a disc medium of a decoder.

For example, a digital versatile disc (DVD) has a certain recording section, or BCA, as shown in FIG. 1. The BCA is formed by a striped pattern, which is defined by radially extending stripes, in correspondence with the data that is to be recorded. Identification information, which differs between each disc medium, or encoding and decoding keys may be recorded in the striped pattern. Illegal copying of the information recorded on a disc medium may be prevented by recording identification information or the like in the BCA.

FIG. 2 illustrates the format of the data recorded in the BCA. The data recorded in the BCA basically has one byte of a synchronization pattern (synch SB or synch RS) added to the head of every four bytes of data. One byte of a first synchronization pattern (synch $SB_{BCA}$) and four bytes of preamble data (BCA preamble) are added to the head of the data recorded on the BCA.

The total five bytes of the first synchronization pattern and the preamble data are followed by data configured by a multiple of twenty bytes. In the following data, one byte of a second synchronization pattern (re-synch RS) is added to the head of every four bytes of the information data that is to be recorded. As shown in FIG. 2, different second synchronization patterns $RS_{BCA1}$, $RS_{BCA2}$, . . . are added to every sixteen bytes. As denoted by $D_0$, $D_1$, . . . in FIG. 2, four bytes of error detection data, or an error detection code (EDC), are added to the information data that is a multiple of sixteen bytes.

The EDC is followed by a parity configured by sixteen bytes, as denoted by $C_{0,0}$, $C_{1,0}$, . . . in FIG. 2. The parity is added to the information data and the EDC to function as error correction data, or an error correction code (ECC). One byte of a third synchronization pattern (re-synch $RS_{BCA13}$) is added to the head of every four bytes of the parity. Every third synchronization pattern has the same value.

The parity data is followed by one byte of a fourth synchronization pattern (re-synch $RS_{BCA13}$), four bytes of postamble data (BCA postamble), and one byte of a fifth synchronization pattern (re-synch $RS_{BCA15}$).

Among the multiple pieces of data, fixed data patterns are set for the first and fifth synchronization patterns, the preamble data, and the postamble data.

A predetermined modulation is performed on the data of FIG. 2 to generate channel data, which is recorded on the BCA. Basically, the modulation is phase modulation (phase encoding). The phase modulation is performed by modulating "0" to "10" or "1" to "01" in order to convert one-bit data to two-bit data.

The first and fifth synchronization patterns are set in an exceptional manner, as shown in FIG. 3. More specifically, the former half of these synchronization patterns are preset by the same eight-bit fixed pattern, which serves as channel bits. Thus, the modulation of "0" to "10" or "1" to "01" is not performed on the eight-bit data in the former half of these synchronization patterns.

With regard to the synch code, or the four bits of data bits in the latter half of each synchronization pattern, different values are designated for each synchronization pattern. The synch codes undergo modulation in which "0" is converted to "10" and "1" is converted to "01". For example, the synch code of the first synchronization pattern $SB_{BCA}$ having four bits of data bit, which is "0000", undergoes phase modulation and is converted to eight bits of channel bits, which is "10101010". In this manner, the eight bits of the fixed pattern and the phase-modulated eight bits of channel bits generate the channel data of each synchronization pattern. The channel data further undergoes return to zero (RZ) modulation before being recorded in the BCA.

In this manner, data is recorded to the BCA in the predetermined format. Thus, a decoder may be used to retrieve the identification information, encoding key, and decoding key that are included in each disc medium. The decoder decodes the data recorded in the BCA to perform error correction in accordance with the parities and retrieve accurate information from the information data.

However, the information may not be accurately retrieved from the information data when the data recorded in the BCA includes a missing part when noise is mixed in during reproduction of the data. For example, when the first synchronization pattern $SB_{BCA}$ cannot be detected, the head of the information data cannot be identified. Thus, decoding cannot be performed subsequently. Further, if the third synchronization pattern (re-synch $RS_{BCA13}$)added to the head of every four bytes of the ECC parity cannot be detected, this may interfere with error correction or the identification of the end of the information data during data reproduction.

SUMMARY OF THE INVENTION

One aspect of the present invention is a decoder for decoding reproduced data including preamble data, which is read from a certain recording section of a disc medium and to which a first synchronization pattern is added, and information data, which follows the preamble data and to which a second synchronization pattern is added. The decoder includes a memory for storing a first comparison pattern corresponding to the first synchronization pattern, a second comparison pattern corresponding to the preamble data, and a third comparison pattern corresponding to the second synchronization pattern. A comparison circuit is connected to the memory to compare the first synchronization pattern, the preamble data, and the second synchronization pattern respectively with the first to third comparison patterns. A determination circuit is connected to the comparison circuit to generate a start trigger signal instructing to start decoding when at least two of the first synchronization pattern, the preamble data, and the second synchronization pattern match the corresponding comparison pattern. A decoding circuit is connected to the determination circuit to start error correction of the reproduced data in response to the start trigger signal.

A further aspect of the present invention is a decoder for decoding reproduced data including preamble data, which is read from a certain recording section of a disc medium and to which a first synchronization pattern is added, and information data, which follows the preamble data and to which a second synchronization pattern is added. The decoder includes a memory for storing a first comparison pattern corresponding to the first synchronization pattern, a second comparison pattern corresponding to the preamble data, and a third comparison pattern corresponding to the second synchronization pattern. A comparison circuit is connected to the memory to compare the first synchronization pattern, the preamble data, and the second synchronization pattern respectively with the first to third comparison patterns. A determination circuit is connected to the comparison circuit to generate a start trigger signal instructing to start decoding when at least two of the first synchronization pattern, the preamble data, and the second synchronization pattern match the corresponding comparison pattern. A decoding circuit is connected to the determination circuit to start error correction of the reproduced data in response to the start trigger signal. The comparison circuit tolerates a constant margin of error produced when comparing the first synchronization pattern, the preamble data, and the second synchronization pattern respectively with the first to third comparison patterns.

A further aspect of the present invention is a decoder for decoding reproduced data including preamble data, which is read from a certain recording section of a disc medium and to which a first synchronization pattern is added, and information data, which follows the preamble data and to which a second synchronization pattern is added. The decoder includes a memory for storing a first comparison pattern corresponding to the first synchronization pattern, a second comparison pattern corresponding to the preamble data, a third comparison pattern corresponding to the second synchronization pattern, and a fourth comparison pattern corresponding to a third synchronization pattern added to error correction codes following the information data. A comparison circuit is connected to the memory to compare the first synchronization pattern, the preamble data, the second synchronization pattern, and the third synchronization pattern respectively with the first to fourth comparison patterns. A determination circuit is connected to the comparison circuit to generate a start trigger signal instructing to start decoding when at least two of the first synchronization pattern, the preamble data, and the second synchronization pattern match the corresponding comparison pattern. A decoding circuit is connected to the determination circuit to start error correction of the reproduced data in response to the start trigger signal. A buffering circuit is connected to the determination circuit and the decoding circuit to transfer data with a buffer memory connected to the decoder. The comparison circuit tolerates a predetermined margin of error produced when comparing the first synchronization pattern, the preamble data, and the second synchronization pattern respectively with the first to third comparison patterns and tolerates a predetermined margin of error produced when comparing the third synchronization pattern with the fourth comparison pattern for every data amount unit to which the third synchronization pattern is repetitively added. The determination circuit generates a stop trigger signal when the comparison circuit detects the third synchronization pattern and the fourth comparison pattern being matched with each other a plurality of times. The buffering circuit provides the buffer memory with the reproduced data from the decoding circuit in response to the start trigger signal and stops providing the buffer memory with data in response to the stop trigger signal.

A further aspect of the present invention is a method for controlling a decoder that decodes reproduced data including preamble data, which is read from a certain recording section of a disc medium and to which a first synchronization pattern is added, and information data, which follows the preamble data and to which a second synchronization pattern is added. The decoder includes a memory. The method includes storing a first comparison pattern corresponding to the first synchronization pattern, a second comparison pattern corresponding to the preamble data, and a third comparison pattern corresponding to the second synchronization pattern; retrieving the first synchronization pattern, the preamble data, and the second synchronization pattern; comparing the first synchronization pattern, the preamble data, and the second synchronization pattern respectively with the corresponding comparison patterns; generating a start trigger signal instructing to start decoding when at least two of the first synchronization pattern, the preamble data, and the second synchronization pattern match the corresponding comparison pattern; starting error correction of the reproduced data in response to the start trigger signal; and providing the reproduced data to a buffer memory in response to the start trigger signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic plan view illustrating a BCA of a DVD in the prior art;

FIG. 2 is a table illustrating the format of the data recorded in the BCA of FIG. 1;

FIG. 3 is a table of the data recorded in the BCA;

FIG. 5 is a chart illustrating an example of reproduced data that is tolerated as a margin of an error;

DETAILED DESCRIPTION OF THE PREFERRED EMBODIMENTS

Figure 4:
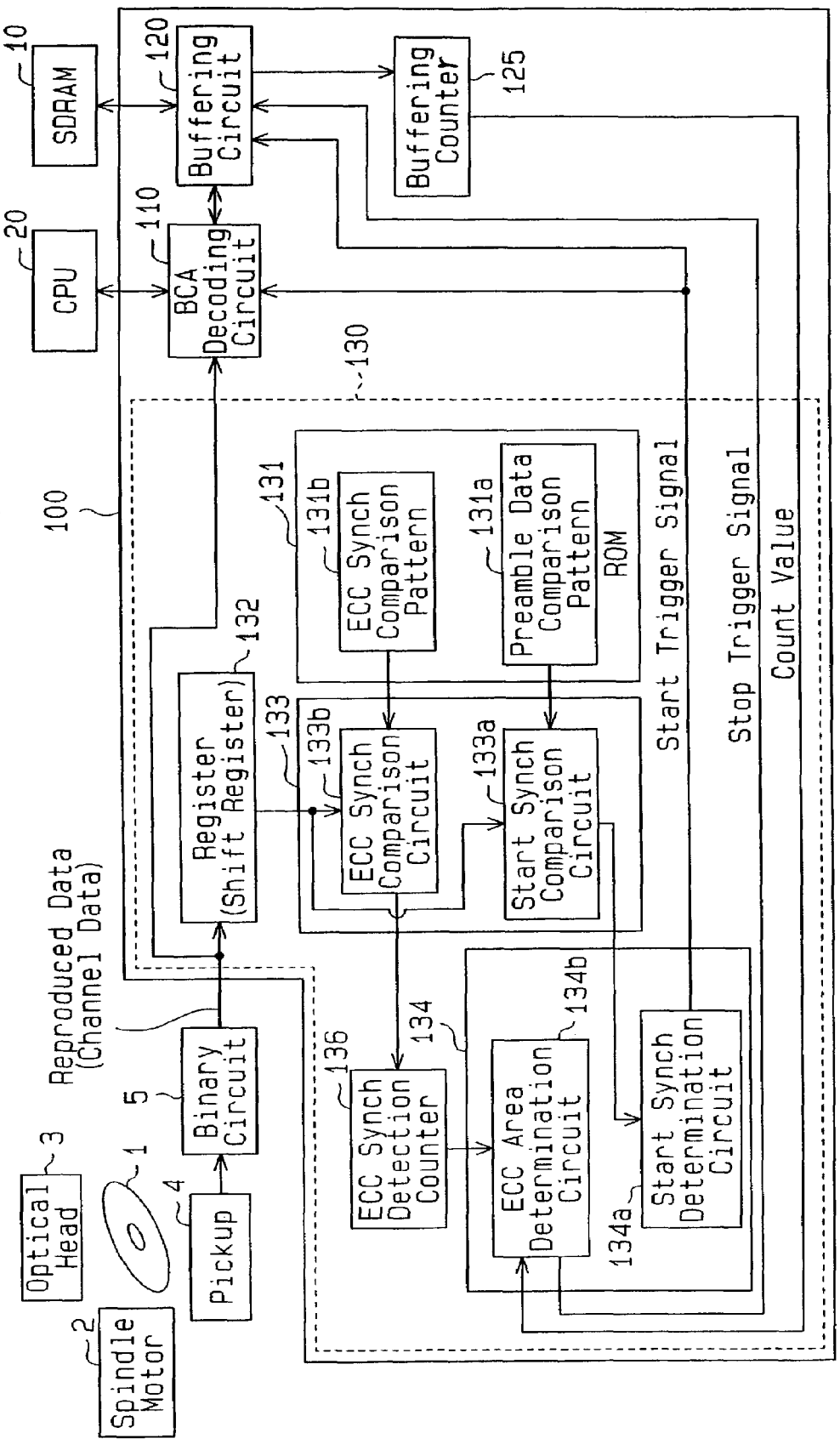
FIG. 4 is a schematic block diagram of a decoder according to a preferred embodiment of the present invention.

In the drawings, like numerals are used for like elements throughout.

FIG. 4 is a schematic block diagram of a decoder 100 according to a preferred embodiment of the present invention. The decoder 100 is applied to a DVD reproducing device 200. FIG. 4 shows the peripheral circuits of the decoder 100 in the DVD reproducing device 100.

An optical disc (DVD) 1 includes the BCA of FIG. 1. A spindle motor 2 controls the rotation of the optical disc 1. An optical disc 1 radiates a laser beam to the optical disc 1. The reflection of the laser beam is received by the pickup. A binary circuit 5 generates binary data from the reflection and performs a demodulation process corresponding to RZ modulation on the binary data to generate channel data. The channel data is provided to the decoder 100.

The decoder 100 decodes channel bits (reproduced DVD data) and provides the decoded, reproduced DVD data to a synchronous dynamic random access memory (SDRAM) 10. In other words, the decoder 100 decodes the reproduced data read from the BCA of the DVD and extracts the synchronization information of BCA data (identification data), which is recorded in the BCA. A central processing unit (CPU) 20 controls the circuits of the reproducing device 200, such as the decoder 100, in a centralized manner.

The decoder 100 will now be described in further detail. The decoder 100 includes a BCA decoding circuit 110, which demodulates and decodes the channel bits, and a buffering circuit, which buffers the channel bits. In the optical disc 1, two bytes of channel data, which is generated by performing modulation on one byte of data bit, is recorded as channel data. Hereinafter, unless otherwise specified, byte numbers represent the number of bytes in data bit units.

The BCA decoding circuit 110 demodulates and decodes the phase-modulated channel data. The decoding includes error detection using the EDC of FIG. 2 in the demodulated data and syndrome calculation related with the error correction of the ECC. The CPU 20 performs error correction of the ECC using the result of the syndrome calculation.

A buffering circuit 120 buffers the input data when instructed to start buffering and provides the buffered data to the SDRAM 10 whenever the buffered data reaches a predetermined amount (e.g., four bytes). A buffering counter 125 monitors the buffering state of the buffering circuit 120.

A BCA synchronization pattern detection circuit 130 detects data having the preset value of the data of FIG. 2 and detects data position information of the provided channel data. The BCA synchronization pattern detection circuit 130 detects the synchronization pattern and the preamble data. More specifically, the BCA synchronization pattern detection circuit 130 detects the six bytes of data ($SB_{BCA}$, BCA Preamble, and $RS_{BCA1}$) added in front of the information data (I0, I1, . . . ) and generates a start trigger signal in accordance with the detection. The start trigger signal is provided to the buffering circuit 120. The buffering circuit 120 starts buffering in accordance with the start trigger signal.

The BCA synchronization pattern detection circuit 130 detects the boundary between the parity of the ECC shown in FIG. 2 and the fourth synchronization pattern (re-synch $RS_{BCA14}$) and generates a stop trigger signal for instructing the termination of buffering with the buffering circuit 120.

In the preferred embodiment, the head of the BCA data (identification data) is detected when the reproduced data matches at least two among a first comparison pattern corresponding to the first synchronization pattern ($SB_{BCA}$), a second comparison pattern corresponding to the preamble data (BCA Preamble), and a third comparison pattern corresponding to the second synchronization pattern. More specifically, as shown in FIG. 4, the BCA synchronization pattern detection circuit 30 stores first to third comparison patterns (preamble data comparison pattern) 131a in the ROM 131.

The ROM 131 stores two comparison patterns, the preamble data comparison pattern 131a and an ECC synch comparison pattern (fourth comparison pattern) 131b. The preamble data comparison pattern 131a is the data pattern of a bit array corresponding to the six bytes of data ($SB_{BCA}$, BCA Preamble, and $RS_{BCA1}$) added to the front of the information data of FIG. 2. The ECC synch comparison pattern 131b is the data pattern corresponding to one byte of the third synchronization pattern (re-synch $RS_{BCA13}$) added to every four bytes of the parity shown in FIG. 2. The comparison patterns 131a and 131b actually correspond to channel data, such as that shown in FIG. 3. Thus, in channel bit units, the preamble data comparison pattern 131a is twelve bytes of data, and the ECC synch comparison pattern 131b is two bytes of data.

To compare the comparison patterns 131a and 131b stored in the ROM 131 with the channel data provided to the BCA synchronization pattern detection circuit 130, the BCA synchronization pattern detection circuit 130 performs the process described below.

The channel data provided to the buffering circuit 120 and the BCA decoding circuit 110 is first stored in a register 132, which is a shift register. The register 132 has a memory section of 12 bytes in channel bit units corresponding to the data length of the preamble data comparison pattern 131a. A comparison circuit 133 compares the channel data (reproduced data) stored in the register 132 with the comparison pattern 131a. A determination circuit 134 detects the head of the BCA data (identification data) from the comparison result. Further, the determination circuit 134 recognizes the end of the BCA data (identification data) from the comparison result of the channel data stored in the register 132 by the comparison circuit 133 and the ECC synch comparison pattern 131b.

More specifically, a start synch comparison circuit 133a in the comparison circuit 133 compares the data stored in the register 132 with the preamble data comparison pattern 131a. If it is determined from the comparison that the channel data stored in the register 132 matches the preamble data comparison pattern 131a, a start synch determination circuit 134a in the determination circuit 134 determines that the channel data stored in the register 132 is the head of the BCA data and generates a start trigger signal.

The start trigger signal is provided to the BCA decoding circuit 110 and the buffering circuit 120. In response to the start trigger signal, the BCA decoding circuit 110 starts decoding the reproduced data, and the buffering circuit 120 starts the buffering process. The buffering process eliminates the synchronization pattern.

The BCA synchronization pattern detection circuit 130 compares the data stored in the register 132 and the ECC synch comparison pattern 131b with a ECC synch comparison circuit 133b to detect the end of the parity in the ECC. More specifically, in the preferred embodiment, during each period in which 16 bytes of data (data bits) are buffered, the ECC synch detection counter 136 monitors the comparison result of the ECC synch comparison circuit 133b. In other words, the second synchronization pattern added to the head of the information data and the third synchronization pattern added to the parity of the ECC repeats the same synchronization pattern $RS_{BCAB}$ four times during the period in which 16 bytes of data (data bits) is buffered. Thus, whenever the same synchronization pattern is repeated, the channel data stored in the register 132 is compared with the ECC synch comparison pattern 131b.

When the ECC synch comparison circuit 133b determines that the data stored in the register 132 matches the ECC synch comparison pattern 131b, the ECC synch detection counter 136 increments the count value. In the preferred embodiment, if it is determined that the channel data stored in the register 132 matches the ECC synch comparison pattern 131b twice or more whenever the same synchronization pattern is repeated, an ECC area determination circuit 134b in the determination circuit 134 generates the stop trigger signal. More specifically, the stop trigger signal is generated when the end of a parity in an ECC is detected.

In the preferred embodiment, a constant margin of error is provided for determining the matching of the data stored in the register 132 and the data pattern 131a of the preamble data comparison pattern 131a. More specifically, when the data stored in the register 132 is "00" or "11" and the data pattern of the preamble data comparison pattern 131a is "10" or "01", it is determined that the data "00" or "11", which is stored in the register 132, is matched. When the data stored in the register 132 is "01" for the data pattern "10" of the preamble data comparison pattern 131a, and the data stored in the register 132 is "10" for the test pattern "01" of the preamble data comparison pattern 131a, it is determined that there is no matching. This is for the two reasons described below.

1. The possibility of, for example, the 2-bit channel data "10" being inverted to "01" is extremely low.

2. When, for example, tolerating a case in which the 2-bit channel bit "10" is inverted to "01", the possibility of data differing from the first synchronization pattern or the preamble data being erroneously recognized as the BCA data is high.

However, among the synchronization patterns of FIG. 3, a case in which "00" of Ch12 and CH13 in the fixed pattern being inverted to "11" is tolerated as an error taking into consideration a burst error.

FIG. 5 shows an example of the reproduced data that is tolerated as an error. Among the preamble data (BCA Preamble) and the first and second synchronization patterns ($SB_{BCA}$ and $RS_{BCA1}$), FIG. 5 shows an example in which the first synchronization pattern ($SB_{BCA}$) has a predetermined number (two) of differing data values. More specifically, the value of the first channel bit (Ch1) of Ch14 and b0 in the first synchronization pattern ($SB_{BCA}$) differs from the first synchronization pattern ($SB_{BCA}$).

In the preferred embodiment, when the error of the reproduced data corresponding to the preamble data (BCA Preamble), the first synchronization pattern ($SB_{BCA}$), and the second synchronization pattern ($RS_{BCA}$) is less than or equal to a predetermined number of bits (e.g., two channel bits), the error between the preamble data (12 bytes in channel bit units) of the BCA data and the preamble data comparison pattern 131a is tolerated. Further, when the error between the third synchronization pattern ($RS_{BCA13}$) of FIG. 2 and the ECC synch comparison pattern 131b is less than or equal to a predetermined number of bits (e.g., two channel bits), the error is tolerated.

The decoding of the reproduced data of the data recorded in the BCA of the preferred embodiment will now be discussed with reference to FIGS. 6 and 7.

Figure 6:
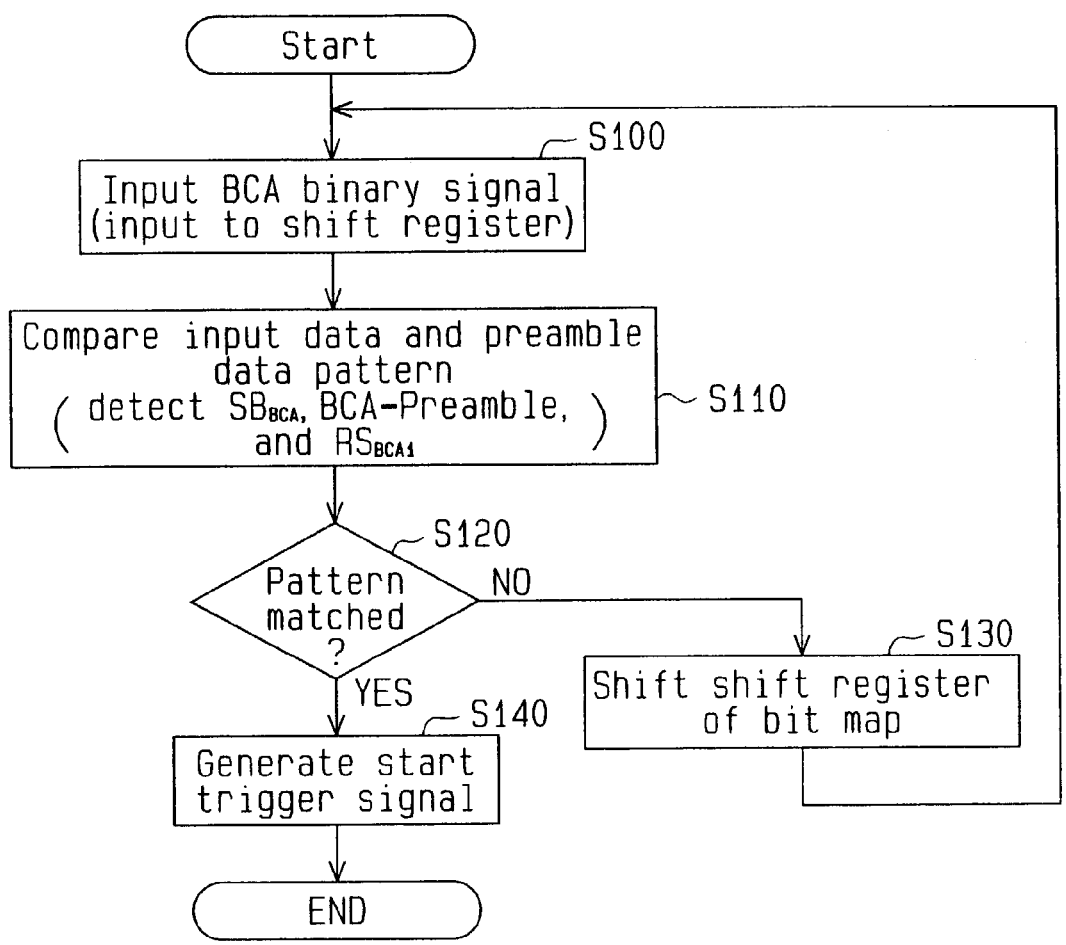
FIG. 6 is a flowchart illustrating the procedure for detecting a synchronization pattern with the decoder of FIG. 4.

With reference to FIG. 6, in step S100, the register 132 retrieves a BCA binary signal (channel data), which is provided to the buffering circuit 120. That is, whenever the buffering circuit 120 retrieves new data, the same data is retrieved by the register 132.

When 12 bytes of reproduced data are stored in the register 132 in channel bit units, in step S110, the start synch comparison circuit 133a compares the channel data stored in the register 132 with the preamble data comparison pattern 131a. More specifically, the two bytes of data at the head of the channel data stored in the register 132 is compared with the first comparison pattern (first comparison), and the eight bytes of data from the third byte to the tenth byte at the head of the data stored in the register 132 are compared with the second comparison pattern (second comparison). Further, two bytes of data, the eleventh byte and the twelfth byte from the head of the data, stored in the register 132 are compared with the third comparison pattern (third comparison).

In steps S120 and S130, the comparison with the start synch comparison circuit 133a is performed until the channel data stored in the register 132 is matched with the preamble data comparison pattern 131a within the above margin of error. During every one of the first to third comparisons, the twelve bytes of channel data stored in the register 132 is determined as being the BCA data (identification data) only when the channel data stored in the register 132 matches the comparison pattern within the predetermined margin of error.

Among any two of the first to third comparisons, when the data stored in the register 132 is matched with the comparison pattern within the predetermined margin of error, the twelve bytes of data stored in the register 132 may be determined as being the preamble data of the BCA data.

In step S120, if the data does not match, the stored twelve bytes of channel data are shifted by one bit and the next comparison is performed. More specifically, the register 132 outputs one bit of data at the head of the twelve bytes of channel data and then retrieves one bit of reproduced data recorded in the BCA. The order of the data recorded in the BCA is set so that it matches the order of the data retrieved in the register 132 or the buffering circuit 120. Such setting is performed so that the operation clock of the register 132 or the buffering circuit corresponds to the movement of the optical disc 1, the rotation of which is controlled.

When the channel data stored in the register 132 matches the preamble data comparison pattern 131a, in step S140, the start synch determination circuit 134a generates the start trigger signal and provides the start trigger signal to the buffering circuit 120 and the BCA decoding circuit 110.

Figure 7:
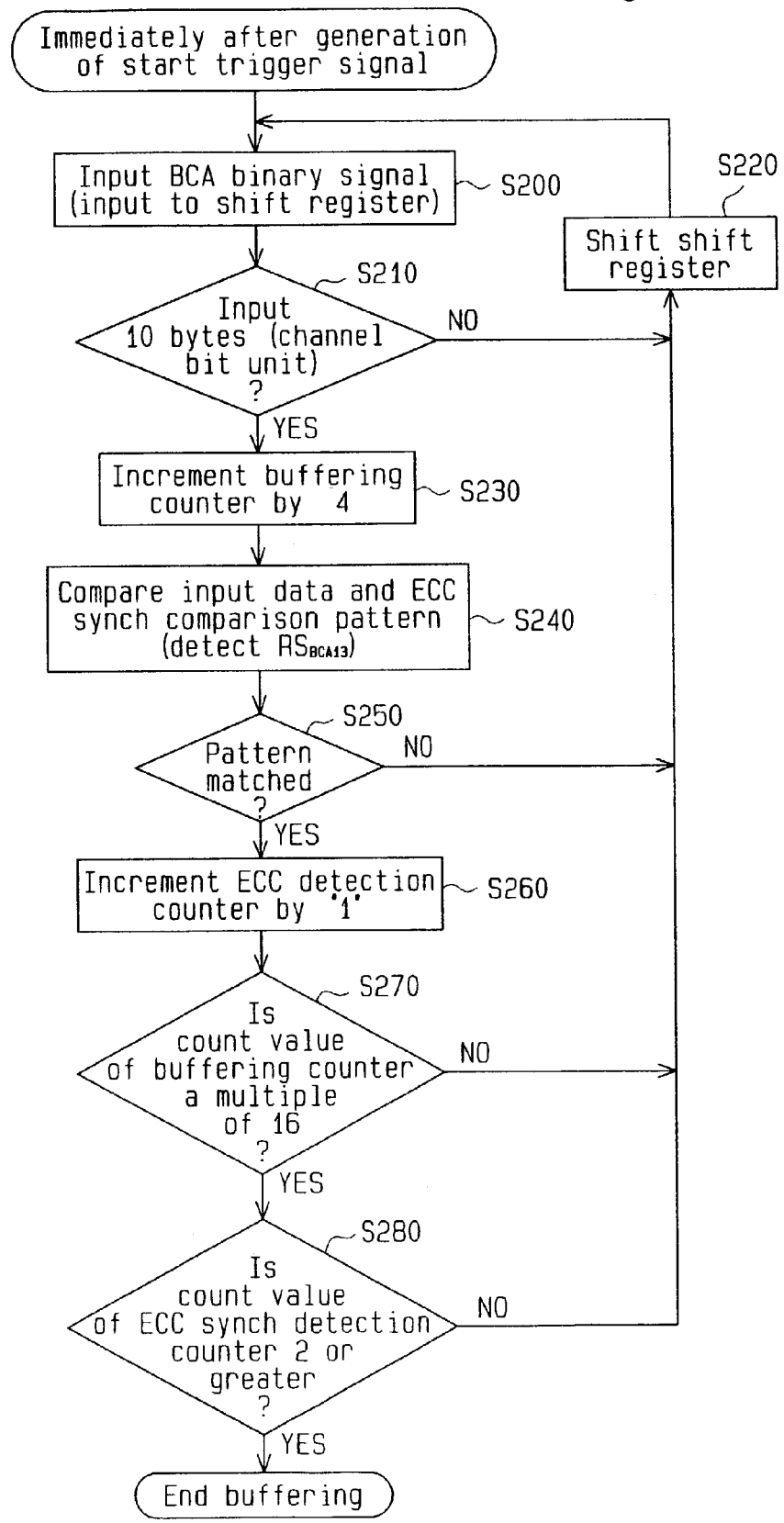
FIG. 7 is a flowchart illustrating the procedure for detecting the synchronization pattern with the decoder of FIG. 4.

After the buffering is started, as shown in step S200 of FIG. 7, channel data is retrieved in the register 132 and the preamble data is output. In synchronism with the retrieval of channel data in the register 132, the buffering circuit 120 sequentially buffers the information data of FIG. 2. The buffered data is sequentially provided to the SDRAM 10.

In steps S210 and S220, the register 132 sequentially shifts the data matched in step S120 until 10 bytes of channel data (five bytes in data bit units) are newly provided to the register 132. In step 230, the buffering counter 125 increments its count value by "4" whenever ten bytes of channel data are provided.

The incrementing of the counter 125 corresponds to the data amount buffered by the buffering circuit 120. That is, ten bytes of channel data are newly provided to the buffering circuit when the register 132 is newly provided with ten bytes of channel data. Since the first two bytes of channel data is the synchronization pattern $RS_{BCA}$, which is not buffered, eight bytes of channel data (four bytes in data bit units) are buffered.

Then, in step S240, whenever the register 132 is newly provided with ten bytes of channel data, the ECC synch comparison circuit 133b compares the first two bytes of data with the ECC synch comparison pattern 131b (fourth comparison). In step S250, the fourth comparison is performed until the first two bytes of channel data matches the ECC synch comparison pattern 131b within the above margin of error.

In step S250, when the first two bytes of channel data (one byte in data bit units) are determined as matching the ECC synch comparison pattern 131b, in step S260, the ECC synch detection counter 136 increments the count value by "1". In other words, the ECC synch detection counter 136 counts the number of times the third synchronization pattern ($RS_{BCA13}$) is detected.

In step S270, the ECC area determination circuit 134b determines whether the count value of the buffering counter 125 is a multiple of sixteen. The determination continues until the count value of the buffering counter 125 reaches a multiple of sixteen. Further, the determination is performed to monitor the count value of the buffering counter 125 during each period in which the same synchronization pattern is repeated.

When the count value of the buffering counter 125 reaches a multiple of sixteen, in step S280, the ECC area determination circuit 134b determines whether the count value of the ECC synch detection counter is two or greater. That is, the ECC area determination circuit 134b determines whether the channel data stored in the register 132 matches the ECC synch comparison pattern 131b twice or more during each period in which the same synchronization pattern is repeated. When determining that there is a matching two or more times, the ECC area determination circuit 134b generates the stop trigger signal and provides the stop trigger signal to the buffering circuit 120. The buffering circuit 120 stops the buffering in accordance with the stop trigger signal.

The decoder 100 of the preferred embodiment has the advantages described below.

(1) When the first and second synchronization patterns and the preamble data comparison pattern match the corresponding reproduced data within the predetermined margin of error (e.g., two channel bits or less), the head of the reproduced BCA data (identification data) is detected. Thus, even if data is missing in the BCA or noise gets mixed in with the reproduced data, the recognition of the head of the BCA is guaranteed and buffering is accurately started.

(2) During each period in which the third synchronization pattern is repeated, when the channel data stored in the register 132 matches the ECC synch comparison pattern 131b within the predetermined margin of error (e.g., two channel bits or less), buffering is stopped. Thus, even if data is missing in the data or noise gets mixed in with the reproduced data, buffering is accurately stopped after the parity data to which the third synchronization pattern ($RS_{BCA13}$) is added.

It should be apparent to those skilled in the art that the present invention may be embodied in many other specific forms without departing from the spirit or scope of the invention. Particularly, it should be understood that the present invention may be embodied in the following forms.

The number of bits in the tolerated margin of error is not limited to two channel bits and may be, for example, three channel bits or may differ between comparison patterns.

When the decoder 100 is provided with data that has not undergone demodulation after RZ modulation, the comparison pattern corresponding to the data that has undergone RZ modulation is used.

The buffering may be ended at any time as long as the ECC synch comparison pattern 131b matches the data buffered by the buffering circuit 120 within the predetermined margin of error.

The memory that stores the comparison patterns is not limited to the ROM 131 and may be, for example, a backup RAM.

The buffering circuit does not have to function to temporarily store multiple bits of data as long as the received data is provided to the SDRAM in accordance with an instruction from an external device.

The present examples and embodiments are to be considered as illustrative and not restrictive, and the invention is not to be limited to the details given herein, but may be modified within the scope and equivalence of the appended claims.

What is claimed is:

1. A decoder for decoding reproduced data including preamble data, which is read from a certain recording section of a disc medium and to which a first synchronization pattern is added, and information data, which follows the preamble data and to which a second synchronization pattern is added, the decoder comprising:
a memory for storing a first comparison pattern corresponding to the first synchronization pattern, a second comparison pattern corresponding to the preamble data, and a third comparison pattern corresponding to the second synchronization pattern;
a comparison circuit connected to the memory to compare the first synchronization pattern, the preamble data, and the second synchronization pattern respectively with the first to third comparison patterns;
a determination circuit connected to the comparison circuit to generate a start trigger signal instructing to start decoding when at least two of the first synchronization pattern, the preamble data, and the second synchronization pattern match the corresponding comparison pattern; and
a decoding circuit connected to the determination circuit to start error correction of the reproduced data in response to the start trigger signal.

2. The decoder according to claim 1, further comprising:
a buffering circuit connected to the determination circuit and the decoding circuit to transfer data with a buffer memory connected to the decoder, wherein the buffering circuit provides the buffer memory with the reproduced data from the decoding circuit in response to the start trigger signal.

3. The decoder according to claim 2, wherein:
the memory further stores a fourth comparison pattern corresponding to a third synchronization pattern added to error correction codes following the information data of the reproduced data;
the comparison circuit compares the third synchronization pattern with the fourth comparison pattern;
the determination circuit generates a stop trigger signal when the third synchronization pattern matches the fourth comparison pattern; and
the buffering circuit stops providing the buffer memory with data in response to the stop trigger signal.

4. The decoder according to claim 3, wherein:
the third synchronization pattern is added repetitively in correspondence with each predetermined amount of the error correction codes;
the comparison circuit compares the third synchronization pattern with the fourth comparison pattern for each data amount unit to which the third synchronization pattern has been added; and
the determination circuit generates the stop trigger signal when the comparison circuit detects the third synchronization pattern and the fourth comparison pattern being matched with each other a plurality of times.

5. A decoder for decoding reproduced data including preamble data, which is read from a certain recording section of a disc medium and to which a first synchronization pattern is added, and information data, which follows the preamble data and to which a second synchronization pattern is added, the decoder comprising:
a memory for storing a first comparison pattern corresponding to the first synchronization pattern, a second comparison pattern corresponding to the preamble data, and a third comparison pattern corresponding to the second synchronization pattern;
a comparison circuit connected to the memory to compare the first synchronization pattern, the preamble data, and the second synchronization pattern respectively with the first to third comparison patterns;

a determination circuit connected to the comparison circuit to generate a start trigger signal instructing to start decoding when at least two of the first synchronization pattern, the preamble data, and the second synchronization pattern match the corresponding comparison pattern; and a decoding circuit connected to the determination circuit to start error correction of the reproduced data in response to the start trigger signal;

wherein the comparison circuit tolerates a predetermined margin of error produced when comparing the first synchronization pattern, the preamble data, and the second synchronization pattern respectively with the first to third comparison patterns.

6. The decoder according to claim 5, further comprising:
a buffering circuit connected to the determination circuit and the decoding circuit to transfer data with a buffer memory connected to the decoder, wherein the buffering circuit provides the buffer memory with the reproduced data from the decoding circuit in response to the start trigger signal.

7. The decoder according to claim 6, wherein:
the memory further stores a fourth comparison pattern corresponding to a third synchronization pattern added to error correction codes following the information data of the reproduced data;
the comparison circuit compares the third synchronization pattern with the fourth comparison pattern;
the determination circuit generates a stop trigger signal when the third synchronization pattern matches the fourth comparison pattern; and
the buffering circuit stops providing the buffer memory with data in response to the stop trigger signal.

8. A decoder for decoding reproduced data including preamble data, which is read from a certain recording section of a disc medium and to which a first synchronization pattern is added, and information data, which follows the preamble data and to which a second synchronization pattern is added, the decoder comprising:
a memory for storing a first comparison pattern corresponding to the first synchronization pattern, a second comparison pattern corresponding to the preamble data, a third comparison pattern corresponding to the second synchronization pattern, and a fourth comparison pattern corresponding to a third synchronization pattern added to error correction codes following the information data;
a comparison circuit connected to the memory to compare the first synchronization pattern, the preamble data, the second synchronization pattern, and the third synchronization pattern respectively with the first to fourth comparison patterns;
a determination circuit connected to the comparison circuit to generate a start trigger signal instructing to start decoding when at least two of the first synchronization pattern, the preamble data, and the second synchronization pattern match the corresponding comparison pattern;
a decoding circuit connected to the determination circuit to start error correction of the reproduced data in response to the start trigger signal; and
a buffering circuit connected to the determination circuit and the decoding circuit to transfer data with a buffer memory connected to the decoder;
wherein the comparison circuit tolerates a predetermined margin of error produced when comparing the first synchronization pattern, the preamble data, and the second synchronization pattern respectively with the first to third comparison patterns and tolerates a predetermined margin of error produced when comparing the third synchronization pattern with the fourth comparison pattern for every data amount unit to which the third synchronization pattern is repetitively added;

wherein the determination circuit generates a stop trigger signal when the comparison circuit detects the third synchronization pattern and the fourth comparison pattern being matched with each other a plurality of times; and wherein the buffering circuit provides the buffer memory with the reproduced data from the decoding circuit in response to the start trigger signal and stops providing the buffer memory with data in response to the stop trigger signal.

9. A method for controlling a decoder that decodes reproduced data including preamble data, which is read from a certain recording section of a disc medium and to which a first synchronization pattern is added, and information data, which follows the preamble data and to which a second synchronization pattern is added, wherein the decoder includes a memory, the method comprising:
storing a first comparison pattern corresponding to the first synchronization pattern, a second comparison pattern corresponding to the preamble data, and a third comparison pattern corresponding to the second synchronization pattern;
retrieving the first synchronization pattern, the preamble data, and the second synchronization pattern;
comparing the first synchronization pattern, the preamble data, and the second synchronization pattern respectively with the corresponding comparison patterns;
generating a start trigger signal instructing to start decoding when at least two of the first synchronization pattern, the preamble data, and the second synchronization pattern match the corresponding comparison pattern;
starting error correction of the reproduced data in response to the start trigger signal; and
providing the reproduced data to a buffer memory in response to the start trigger signal.

10. The method according to claim 9, further comprising:
storing in the memory a fourth comparison pattern corresponding to a third synchronization pattern added to error correction codes following the information data of the reproduced data;
retrieving the error correction codes to which the third synchronization pattern is added;
comparing the third synchronization pattern with the fourth comparison pattern;
generating a stop trigger signal when the third synchronization pattern matches the fourth comparison pattern; and
stopping said providing the buffer memory with data in response to the stop trigger signal.

11. The method according to claim 10, wherein:
said retrieving error correction codes includes retrieving the third synchronization pattern, which is added repetitively in correspondence with each predetermined amount of the error correction codes, a predetermined times; and
said generating the stop trigger signal includes generating the stop trigger signal when the third synchronization pattern and the fourth comparison pattern are matched with each other a plurality of times.

* * * * *